Oct. 25, 1960  V. W. WOODS  2,957,803
METHOD OF PREPARING SUSPENSIONS OF INSECTICIDES
Filed March 10, 1958
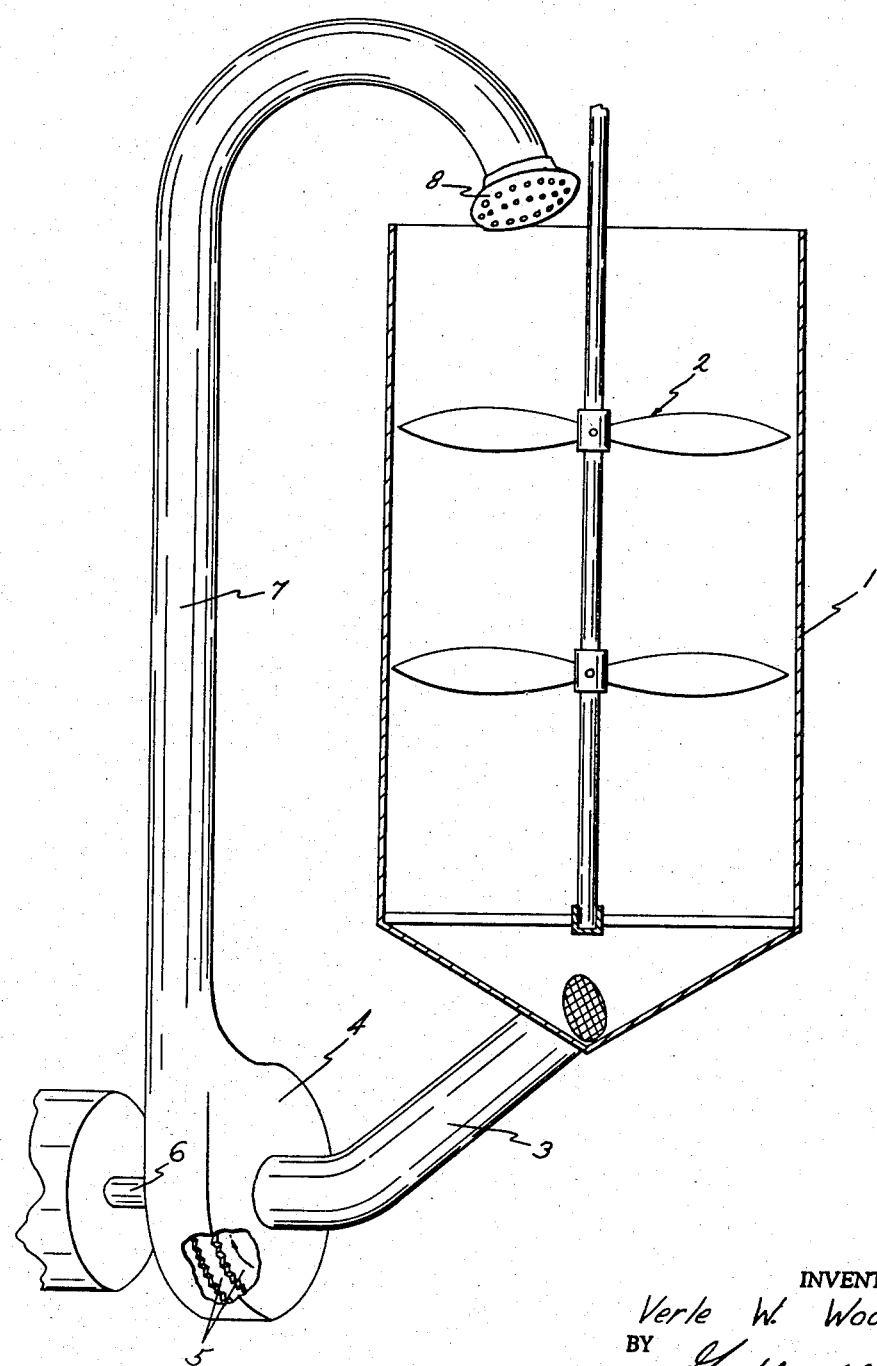
INVENTOR.
Verle W. Woods
BY
Atty.

United States Patent Office 2,957,803
Patented Oct. 25, 1960

2,957,803
METHOD OF PREPARING SUSPENSIONS OF INSECTICIDES

Verle W. Woods, % Crop King Company, P.O. Box 574, Yakima, Wash.

Filed Mar. 10, 1958, Ser. No. 720,432

10 Claims. (Cl. 167—43)

This invention relates to a method of preparing suspensions of chemicals used for insect and weed destruction. In the actual use of such products as metaldehyde, D.D.T., B.H.C., toxaphene, aldrin, methoxychlor, D.D.D., dieldrin, heptachlor, lindane, sulphenone, endrin, hexachlorobenzene, and other organic insecticides of this nature, much difficulty has been encountered with fluid suspension of the products. They tend to separate out before they reach the customer, while they are stored on the shelves of the retailer or dealer. For purposes of this patent application these materials may be designated as non-water soluble organic pesticides.

These materials in the solid form are either of a crystalline or pasty nature. They have to be ground to a relatively fine condition (a fineness of the order of five microns or less) for use in the insecticide field. When reduced to size the particles then have to be dispersed in a carrier fluid so that they may be readily mixed with water for spraying or other means of application to the infested areas.

It is the purpose of my invention to provide a method and means whereby the products mentioned hereinbefore and like solids, may be incorporated in a water suspension that is stable in the range of temperatures normally encountered in the storing of them. According to my invention I reduce the products, from their solid form to the desired fineness by first preparing a liquid base which is made by mixing with water a suitable fat or oil, animal, mineral or vegetable, such as lard, tallow, mineral oil, margarine, or a combination of them, and a substance that goes into solution in the water with an increase in specific gravity of the resultant liquid and no particular reaction with the fat or oil. I have found that urea, or sugar can be used. Sulfite waste liquor from the paper pulp industry provides a low cost additive but other water soluble substances having the same effect can be used. Urea is relatively inexpensive and is non-toxic to the plants on which the spray may be applied, so it is a preferred ingredient for increasing the specific gravity of the liquid. The oil or fat and the water-urea solution are mixed together to form a smooth emulsion. It is desirable to use a suitable emulsifying agent to aid in making the emulsion. Many commercial emulsifiers may be used. Examples of such emulsifying agents are the Triton X 45 and Triton X 155 made and sold by Rohm and Haas of Washington Square, Philadelphia, Pa. Emulsifiers from other sources have proven equally successful. The solids are broken up or ground to the desired fineness while being circulated in the oil-water solution, or fat-water solution emulsion. In this way the particles of solids are brought into contact with the oil or fat globules in the emulsion and become coated with the oil or fat. The oil or fat overcomes the natural tendency of the solid particles to stick to each other and acts as a floating agent on the particles.

The nature and advantages of my invention will appear more fully from the following description and the accompanying drawings illustrating diagrammatically a suitable apparatus for carrying out the invention.

In the drawing:

The figure is a somewhat diagrammatic view illustrating a tank and a combination pump and comminuting device with suitable connections for finely dividing the chemicals and mixing them with the suspension liquid.

In making of a stable suspension of such products as metaldehyde (metaacetaldehyde), D.D.T. (dichloro diphenyl trichloroethane), B.H.C. (benzene hexachloride), aldrin (hexachloro hexahydro dimethano naphthalene) and other organic insecticides such as dieldrin, methoxychlor, D.D.D. sulphenone, hexachlorobenzene, endrin, heptachlor sulphur and lindane, the first step is to break up the chemical solids to a coarse granular form that can be circulated. Crushing, or breaking by any known method can be used. The granular material is then placed in the tank 1 with water, oil or fat, urea or sugar, and the emulsifying agent. The tank contains a rotary agitator 2 which stirs the ingredients continuously. A bottom outlet pipe 3 leads from the tank to a pump 4 which as shown, has blades 5 provided with serrated peripheries. The blades 5 are on the pump shaft 6 and are driven at high speed (about 3000 to 4000 r.p.m.). The blades 5 act to pump the material as well as to break it up and force the material up through a pipe 7 into a spray head 8 which sprays the material down onto the top of the material in the tank 1. This keeps foaming down.

At first, while the size of solid particles remain fairly large, the rate of circulation is high. The particles as they are broken up actually become oil or fat coated and uniformly dispersed through the liquid. This circulation is begun at an elevated temperature of 120 to 130 degrees F. and carried on at this temperature for a period of three to four hours. The temperature is then allowed to drop to about 85 to 100 degrees F. and the circulation is continued for a period sufficient to attain the desired fineness of product. About 48 hours is adequate time to complete the mixing. The resulting product may be bottled and stored, until it is used by mixing with water to form a spray solution. It has been found that the mixture will remain stable on the shelf for months with no appreciable settling or separation at normal room temperatures. If the storing temperature is quite high there will be a tendency in some products to form curds. Also if the storing temperature is too low, the whole mass will solidify.

The following examples will serve to illustrate the specific method:

*Example 1*

90 gallons of water was first placed in a tank and the agitator was started. While the liquid was being agitated violently, 5½ gallons of commercial emulsifier, 80 pounds of urea and 150 pounds of lard were added in the order named. The agitation was carried on until the resulting liquid was smooth, indicating that the urea was dissolved and the lard was dispersed uniformly in the water solution. Next the agitation was made more violent and 1080 pounds of granular metaldehyde was added slowly. The pump 4 was then started and mixing continued for a period of 48 hours with both the agitator and the pump operating. Some water was lost by evaporation during the process.

The product, when allowed to stand, showed no tendency to settle. The particle sizes were of the order of 5 microns and smaller. This product was bottled and marketed. It is a liquid readily dispersed in water. The finished material contains by weight over half of the active ingredient metaldehyde. The particles were found upon examination to have a fat coating adhering to them. The urea appeared to be completely dissolved as no free particles of urea could be found by examination.

*Example 2*

To make a stable D.D.T. liquid suspension, 210 gallons of water was agitated in the tank and 185 pounds of emulsifier, 160 pounds of urea and 520 pounds of lard were mixed with the water, then 1600 pounds of D.D.T. was added slowly to the mixture and pumped in the same manner as in Example 1. The pumping and mixing was continued for approximately 48 hours. The resulting liquid was stable without any settling and was bottled and marketed.

The D.D.T. is somewhat soluble in the fat. Examination of the resulting product showed the D.D.T. particles to be fat coated.

*Example 3*

The same procedure was followed as in Examples 1 and 2 with 1000 pounds benzene hexachloride, 5½ gallons of emulsifier, 150 pounds of lard, 80 pounds of urea and 90 gallons of water. The resulting product after 48 hours of mixing was stable and did not settle out.

*Example 4*

A suspension of aldrin was made using the same procedure as in Examples 1 and 2, with 1000 pounds aldrin, 5½ gallons of emulsifier, 150 pounds of lard, 80 pounds of urea and 90 gallons of water. The resulting product was a stable suspension.

*Example 5*

A suspension of hexachlorobenzene was made following the same procedure as in Examples 1 and 2, with 1000 pounds of hexachlorobenzene, 5½ gallons emulsifier, 150 pounds of lard, 80 pounds of urea and 90 gallons of water. The resulting product was a stable suspension.

I have found that it is desirable to carry on the mixing initially at a somewhat elevated temperature of 120 degrees F. to 130 degrees F. The solids appear to break up more readily and the fat is of course, more fluid and tends to coat the particles of chemical more readily. I have obtained the best results by first mixing and grinding the materials for three to four hours at a temperature of 120 degrees F. to 130 degrees F., then continuing the mixing and grinding at a temperature of 85 degrees F. to 100 degrees F.

*Example 6*

D.D.T. was mixed with a vegetable fat (margarine) in place of the lard of Example 2, the proportions and other ingredients being the same as in Example 2. This resulted in a stable D.D.T. suspension.

*Example 7*

D.D.T. was mixed with mineral oil in place of lard of Example 2, the proportions and other ingredients being the same as in Example 2. This resulted in a stable D.D.T. suspension.

I have also used sugars as a means of providing a water solution of higher specific gravity than water. A low cost substitute for urea is sulfite waste liquor from the paper pulp industry. Sugars having the same effect may be employed. As an example, the D.D.T. formulation of Example 2, was made with a quantity of dried sulfite waste liquor equal to the amount of urea used and without the urea. It was found that a stable suspension resulted.

In cases where the ultimate spray is to be used to control insects on vegetation, I prefer to use urea as the product to increase the specific gravity of the water because it is generally non-toxic to the plants and in fact can supply food for them. When the material is sprayed on the foliage and it does not encourage mold or fungus growth. Also as the water evaporates crystals of urea appear to form on the foliage and are gradually absorbed. The chemical particles tend to attach themselves to the crystals as they are formed and are thus retained in dispersed position so as to contact as many of the insects as possible.

The kind of oil or fat used is, as seen from the above examples, to be primarily a matter of choice. In the claims therefore I use the term fat to include those liquids commonly referred to as oils as well as those substances commonly referred to as fats regardless of whether they are of animal, vegetable or mineral origin.

It is believed that the method of producing stable suspensions of the various insecticides and weed destroyers will be clear from the foregoing description.

Having thus described my invention, I claim:

1. A method of forming a stable suspension of non water soluble organic pesticide solids in water which comprises forming a liquid emulsion of fat in a water-urea solution, introducing the solids into the liquid emulsion and then breaking up the solids in the liquid to particles of a fineness of the order of 5 microns while agitating the liquid and solids together.

2. A method of forming a stable suspension of non water soluble organic pesticide solids in water which comprises forming a liquid emulsion of fat in water to which has been added a substance capable of going into solution in the water to form a water solution of greater specific gravity than water alone, introducing the solids into the liquid emulsion and then breaking up the solids in the liquid emulsion to a fineness of the order of 5 microns.

3. A method of forming a stable solution of metaldehyde particles in water which comprises forming a liquid emulsion of fat in a water urea solution, mixing the metaldehyde with the emulsion and reducing the metaldehyde to particle sizes of the order of 5 microns and less by repeatedly passing the mixture of metaldehyde and emulsion through a comminuting device thereby coating the metaldehyde particles with fat as they are reduced in size.

4. A method of forming a stable suspension of metaldehyde in water which comprises forming a liquid emulsion of fat in a water-urea solution, then grinding the metaldehyde in the emulsion to a fineness of the order of 5 microns, thereby adhering a coating of fat to the metaldehyde particles.

5. A method of forming a suspension of non water soluble organic pesticide solids in water which comprises forming a liquid emulsion of fat in a water solution heavier than water alone, introducing the solids into the liquid emulsion and then grinding the solids in the emulsion to a fineness of the order of 5 microns, thereby adhering a coating of fat to the solids.

6. A method of forming a suspension of D.D.T. solids in water which comprises forming a liquid emulsion of fat in a water solution heavier than water alone, introducing the solids into the liquid emulsion and then grinding the solids in the emulsion to a fineness of the order of 5 microns, thereby adhering a coating of fat to the solids.

7. A method of forming a suspension of D.D.T. solids in water which comprises forming a liquid emulsion of lard in a water-urea solution, introducing the solids into the liquid emulsion and then grinding the solids in the emulsion to a fineness of the order of 5 microns, thereby adhering a coating of lard to the D.D.T. solids as they are reduced in size by grinding.

8. A method of forming a suspension of D.D.T. solids in water which comprises forming a liquid emulsion of mineral oil in a water urea solution introducing the solids into the liquid emulsion and then grinding the solids in the emulsion to a fineness of the order of 5 microns, thereby adhering a coating of mineral oil to the D.D.T. solids as they are reduced in size by the grinding.

9. A method of forming a suspension of D.D.T. solids in water which comprises forming a liquid emulsion of animal fat in a water urea solution, introducing the solids into the liquid emulsion and then grinding the solids in the emulsion to a fineness of the order of 5 microns, thereby adhering a coating of animal fat to the D.D.T. solids as they are reduced in size by the grinding.

10. A method of forming a suspension of D.D.T. solids in water which comprises forming a liquid emulsion of vegetable oil in a water urea solution introducing the solids into the liquid emulsion and then grinding the solids in the emulsion to a fineness of the order of 5 microns, thereby adhering a coating of vegetable oil to the D.D.T. solids as they are reduced in size by the grinding.

References Cited in the file of this patent
UNITED STATES PATENTS

| 2,521,318 | Wohlers | Sept. 5, 1950 |
| 2,765,255 | Swarbrick | Oct. 2, 1956 |

OTHER REFERENCES

Kalish: "Suspensions," D. and C. Ind., vol. 78, No. 4, April 1956, pp. 468, 469 and 573.